May 23, 1944.  F. W. SCHWINN  2,349,762
CUSHIONED HANDLEBAR
Filed Sept. 12, 1941
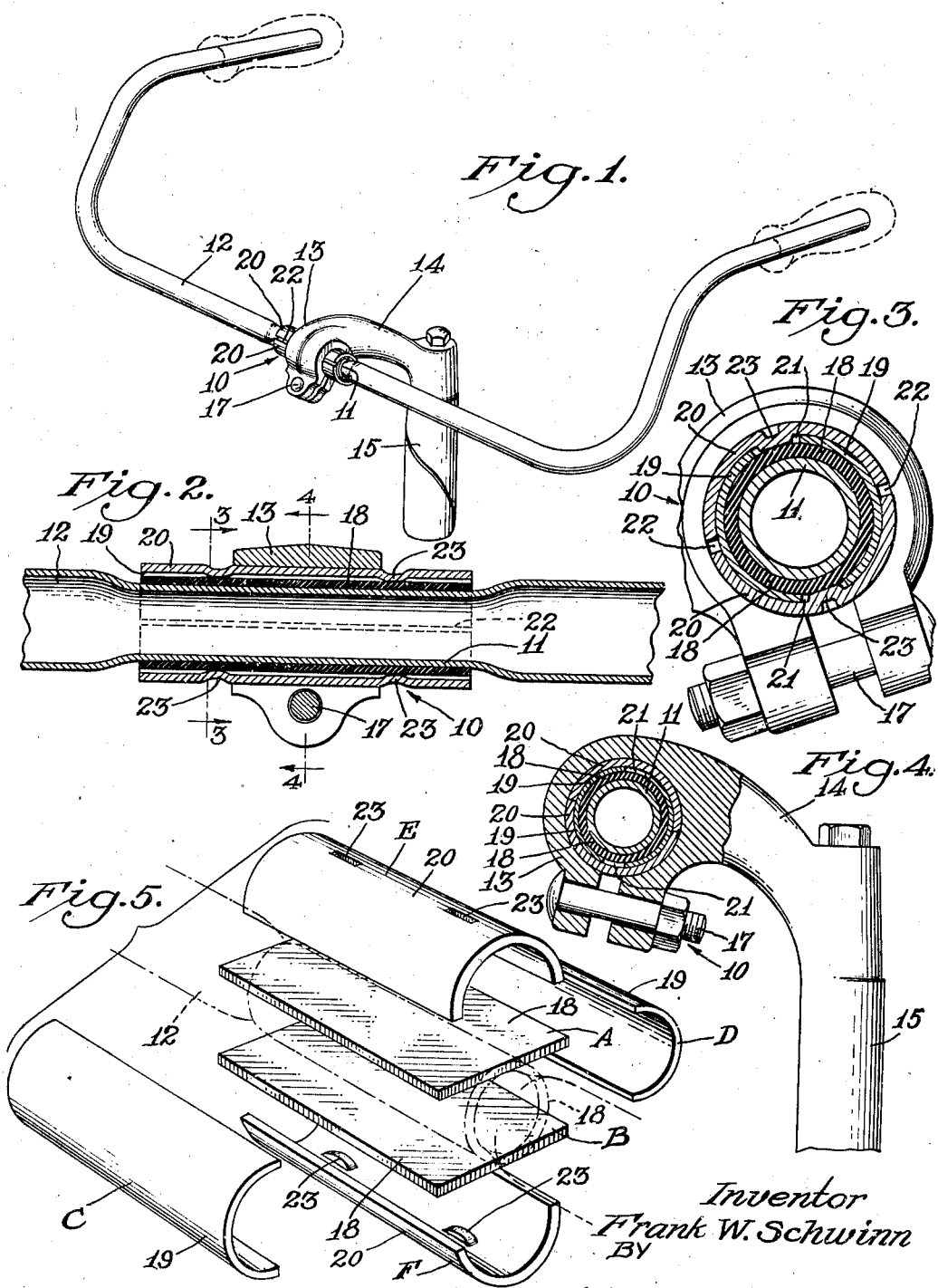
Inventor
Frank W. Schwinn
BY
McCaleb, Wendt & Dickinson
Attorneys.

Patented May 23, 1944

2,349,762

UNITED STATES PATENT OFFICE 2,349,762

CUSHIONED HANDLE BAR

Frank W. Schwinn, Chicago, Ill.

Application September 12, 1941, Serial No. 410,551

8 Claims. (Cl. 287—85)

My invention relates to the cushioning of handlebars for bicycles or the like against the transmission to the handlebar of road shocks or vibrations from the wheels, and particularly the front wheel of the vehicle. This cushioning is effected at the point where the handlebar is engaged by the extension clamp of the steering post.

One object of my invention is to provide a cushioning construction of simple and inexpensive design which is particularly adapted for low cost quantity production methods of manufacture and attains consistently uniform results. In this regard my invention is a substantial improvement over prior handlebar cushions where it has been proposed to encase the clamp-engaged mid-section of the handlebar with a rubber sleeve protected by an unsplit metal protecting sleeve.

Difficulty is encountered in assembling the rubber sleeve and the unsplit metal protecting sleeve of the prior art with the handlebar in preparation for vulcanizing. Furthermore, in the prior devices, it has been practically impossible to attain uniform density and resiliency in the vulcanized rubber sleeves. These difficulties arise from the fact that the space available between the handlebar proper and the inner surface of the protecting sleeve is very limited due to practical restrictions in tube and handlebar diameters which must be closely correlated to the limited diameter of the eye of the extension clamp.

In one prior form it is necessary to slip the sleeves into place from one end of the handlebar, and a special clamp with an enlarged eye is necessary to accommodate the cushion structure. In another prior form it is proposed to equip the handlebar with a special cushion-supporting mid-section of reduced diameter which is butt welded to the side portions of the handlebar after the cushion has been secured in place. In contradistinction to these relatively cumbersome and expensive expedients, my invention permits the use of a one piece handlebar, and also enables mounting of the handlebar, equipped with my cushion, in a standard steering post clamp.

The unsplit protecting sleeves of the prior art being of a fixed diameter, and the diameter of the embraced portion of the handlebar tube or rod being likewise fixed, the interposed rubber sleeve, once it has been assembled with difficulty and vulcanized in place, will retain at all times and under all conditions a fixed soft or hard (i. e. more or less yielding) cushioning effect depending upon the quality of rubber used and the pressure under which it is confined between the metal surfaces.

Another object of my invention is to provide a cushioning structure for handlebars which is susceptible of selective adjustment at the user's option to attain a substantial range of different cushioning effects. That is, the user may, by simple adjustment, secure a more or less yielding cushioning effect to meet his preferences.

Still another object of the invention is to provide an improved method of manufacturing and mounting the handlebar cushion.

The foregoing, together with further objects, features and advantages of my invention, are set forth in the following description of a specific embodiment thereof, and in the accompanying drawing, wherein:

Fig. 1 is a perspective view of a handlebar mounted, according to my invention, in a bicycle steering post;

Fig. 2 is a longitudinal, diametrical section through the medial portion of the handlebar and its mounting;

Fig. 3 is a vertical sectional view taken substantially in the plane of line 3—3 of Fig. 2;

Fig. 4 is a vertical sectional view taken substantially along the line 4—4 of Fig. 2; and Fig. 5 is an assembly view of the cushioning structure.

Referring more particularly to the drawing, a cushioning construction, generally identified by the numeral 10, is interposed between the median portion 11 of a bicycle handlebar 12, and a split clamp 13 which is formed at the forward end of a gooseneck extension 14 carried by a steering post 15. The clamp 13 may be of standard proportions and is adapted to be tightened by the usual bolt 17. In order to accommodate the additional thickness of the cushion between the eye of the clamp 13 and the handlebar, the median portion may be of reduced diameter as shown in Fig. 2.

The cushion 10 comprises a simple arrangement including, as the shock and vibration absorbing element, a sleeve 18 of resilient material such as rubber which encircles and is vulcanized to the reduced median portion 11 of the handlebar. A diametrically split metal sleeve 19 is vulcanized to the rubber sleeve 18 and protects the latter against damage from pinching or otherwise. Embracing the protecting sleeve 19 removably is an outer metal compression sleeve 20 which, in turn, is directly embraced by the jaws of the clamp 13. After the handlebar 12 has been secured in place by the clamp 13, the shock and vibration absorbing rubber sleeve 18 permits slight vertical movement of the handlebar 12 relative to the clamp 13 and, to a greater extent, rocking of the handlebar about the axis of the center section 11. In addition, the handlebar 12 may, under the resiliency of the rubber sleeve 18, rock about any diameter of the handlebar passing through the axis of the center section 11. Thus, the handlebar is permitted practically universal rocking movement by the cushion and the rider's hands and arms are very largely, if not altogether, saved from the fatiguing effects of road shocks and vibrations which would otherwise be transmitted from the wheels of the bicycle up to the handlebar.

Whenever the handlebar is rocked, the resilient cushioning sleeve 18 functions as a torsion spring to return the handlebar to a normal adjusted position.

As shown in Fig. 5, the material of the sleeve 18 may initially consist of two pieces A and B of a suitable grade of raw sheet rubber which are wrapped around the center handlebar section 11 (dot dash outline in Fig. 5) in a mold and heated to vulcanize the rubber to the section 11 and complete the cushioning sleeve. In the vulcanization, of course, the edges of the rubber pieces are permanently and integrally united.

The metal protecting sleeve 19 is preferably pre-formed as a pair of identical semi-cylindrical sections C and D from thin metal, such as brass-plated sheet steel or diametrically split steel tubing. These sleeve sections C and D are assembled, in embracing relation to the material of the sleeve 18, and are permanently vulcanized to the cushioning sleeve throughout their inner faces. By thus forming the sleeve 19 of two sections which may be assembled from opposite sides of the mid-portion 11 of the handlebar the method of manufacture is substantially simplified, as distinguished from the longitudinal assembly necessitated by an unsplit sleeve according to prior teaching. By the present method, it is also possible to attain much more uniform density in the rubber sleeve 18, and thus uniformity of resiliency throughout the sleeve, than where the rubber must be vulcanized within the limited space between an unsplit sleeve and the encircled handlebar.

By having the sleeve 19 of substantial length whereby to distribute the pressure that will be applied through this sleeve to the rubber over a large area, not only is damage to the rubber sleeve 18 prevented, but the rubber sleeve may also be relatively thin while yet affording ample resiliency for the desired cushioning effect. The latter feature is of particular advantage in maintaining the overall diameter of the rubber sleeve 18 and the protecting sleeve 19 to a size not greater than the outside diameter of the main portion of the handlebar 11. This is important in order to enable the cushion to be used where the handlebar is to be assembled with a steering post clamp having a clamp eye of standard dimensions.

The outer or compression sleeve 20 may also be pre-formed from sheet metal or split metal tubing but is preferably of substantially heavier gauge than the sleeve 19, principally because the sleeve 20 is required to withstand the direct compression force of the clamp 13. Where the sleeve 19 is formed of 20-gauge material, for example, the sleeve 20 may be formed of 16-gauge material. For convenience in assembling the sleeve 20 in the cushion structure, it is preferably formed of identical semi-cylindrical sections E and F shaped to embrace the sleeve 19 snugly. The thickness of the sleeve 20 is about the same as the usual spacer sleeve or ferrule provided on the mid-section of conventional handlebars to take up the radial clearance in the eye of the stem clamp. Such clearance in the eye is allowed to permit threading of the handlebar into place through the eye.

In assembling the handlebar with the clamp 13, one of the guide portions of the handlebar is threaded endwise through the eye of the clamp, the sections E and F of the outer sleeve 20 are placed in embracing relation about the sleeve 19, and the assembly is then centered in the clamp 13 and the bolt 17 tightened until the clamp grips the cushion structure 10 firmly enough to hold the handlebar in place.

In order to permit selective tensioning of the cushion, the sections C and D of the sleeve 19 and the sections E and F of the sleeve 20 are so dimensioned circumferentially and are mounted in such relation that, in the uncompressed condition of the cushion structure, the adjacent longitudinal edges of the respective sets of sleeve sections, are held spaced apart by the cushion sleeve 18. As shown in Fig. 3, there is a space 21 between the respective opposed edges of the sections of the sleeve 19, and a space 22 between the edges of the sections of the sleeve 20. Therefore, as the cushion structure is placed under increasing selective pressure by tightening of the clamp 13, the sleeve sections can move slightly toward one another, that is, assume a smaller sleeve diameter, and thus squeeze the rubber sleeve 18 to increase its density and reduce its resiliency. In this manner a "soft" cushion may be had where the clamp 13 is tightened only sufficiently to hold the handlebar against rotational slipping, and a "hard" cushion of less springiness can be had at the user's option by greater tightening of the clamp. Of course, various incremental degrees of tensioning may be obtained between the hard and soft limits by suitable adjustment of the clamp pressure.

If placed under sufficient compression, the rubber sleeve 18 could be rendered practically solid and thus lose its cushioning effect. A limit is therefore placed upon the degree of compression to which the rubber sleeve 18 may be subjected by the clamp 13. In the present instance this limit is attained by appropriately dimensioning the sections E and F of the compression sleeve 20 so that when a predetermined limit of compression is reached, the opposed longitudinal edges abut and prevent further reduction in diameter of the sleeve 20 (Fig. 4). This limitation is absolute.

Relative slippage between the handlebar mid-section 11 and the sleeve of the cushion 10 under the stress of rotational forces to which the handlebar is subjected in use are prevented as between the handlebar, the rubber sleeve 18 and the protecting sleeve 19 by the intimate bond between these parts secured in the vulcanizing process.

As between the protecting sleeve 19 and the compression sleeve 20, rotational slippage is prevented by an interlock relationship. The sleeve sections E and F have narrow longitudinally spaced and alined inwardly extending interlock beads 23 adapted to fit between the opposed spaced edges of the protecting sleeve sections C and D (Figs. 2 and 4). The interlock beads 23 are preferably reasonably flat sided, in keeping with their interlocking function, and narrow enough to avoid the necessity for excessive spacing between the edges of the protecting sleeve sections C and D. By preference, the interlock beads 23 are located on the median longitudinal plane of each of the sections E and F whereby in the assembly of the cushion structure, the edges of the sections E and F are a quarter turn removed from the edges of the protecting sleeve sections C and D. This effects a substantial overlapping of the inner and outer sleeve sections, which has been found to assure uniform compression of the cushion sleeve 18, particularly where the clamp 13 is not perfectly true.

Slippage between the compression sleeve 20 and the eye of the clamp 13 is prevented by the frictional inter-engagement of these parts.

It will thus be apparent that my cushioning structure for handlebars has the distinct advantage over prior constructions of this type in that it may be manufactured far more economically by a substantially simplified process. In this process substantially improved uniformity as to the density and resiliency of the rubber sleeves and therefore of the spring action of the cushion is attained.

Of equal, if not greater, importance is the novel arrangement for selective tensioning of the cushion to meet user preference with respect to the springiness of the cushion.

While I have illustrated and described a preferred embodiment of my invention, it is to be understood that I do not thereby intend to limit my invention to the specific form disclosed, but contemplate that many modifications and alternative constructions or substitutions may be made without departing from the scope and spirit of my invention.

I claim:

1. In combination with a handlebar, a cushioning structure comprising a resilient rubber cushioning sleeve surrounding that portion of the handlebar which is adapted for engagement by a steering post clamp, a split protecting sleeve surrounding the cushioning sleeve, the rubber of the cushioning sleeve being bonded to the handlebar and to the protecting sleeve over considerable areas of contact, and a split compression sleeve embracing said protecting sleeve for receiving the direct compression force of the steering post clamp.

2. A handlebar assembly according to claim 1 wherein the edges of the split sleeves are normally held in spaced relation by the rubber sleeve and are respectively adapted to move closer together under clamp pressure to place the rubber sleeve under compression.

3. A handlebar assembly substantially as defined in claim 1 wherein the protecting sleeve is formed of relatively thin metal, and the compression sleeve is formed of a heavier metal capable of effectively withstanding the strain of the pressure thereagainst of the steering post clamp.

4. A handlebar assembly substantially as set forth in claim 1 wherein the portion of the handlebar which carries the cushioning sleeve is of a reduced diameter to substantially accommodate the thickness of the cushioning and protecting sleeves and thus permit the cushioning sleeve structure to be received within the eye of a standard clamp.

5. In combination with a bicycle handlebar and a steering post clamp for supporting the handlebar in adjusted position, a handlebar cushioning structure interposed between the handlebar and the eye of the steering post clamp, including a resilient sleeve bonded to the handlebar, a protecting sleeve comprising separate semi-cylindrical sections bonded to said cushioning sleeve, and a compression sleeve interposed between said protecting sleeve and the eye of the clamp including a pair of semi-cylindrical sections removably embracing the protecting sleeve, the sections of said compression sleeve overlapping the respective opposed longitudinal edges of the protecting sleeve sections.

6. A construction substantially as set forth in claim 5 wherein the compression sleeve has means interengageable with the edges of the protecting sleeve section so as to hold the sections of the compression sleeve against rotation relative to the protecting sleeve.

7. In combination with a handlebar, a cushion of resilient compressible material engaging that portion of the handlebar which is to be received within a steering post clamp, a diametrically split protecting sleeve engaging said cushion, and held thereby with the opposed longitudinal edges of its sections spaced apart, and a compression sleeve embracing said protecting sleeve and having inwardly extending elements thereon received between the spaced edges of said protecting sleeve to hold the sleeves against relative rotation.

8. In combination in a handlebar construction of the character described, resilient cushioning means surrounding that portion of the handlebar which is adapted to be received within a steering post clamp, and a compression sleeve interposed between the eye of the steering post clamp and the cushioning means, said compression sleeve comprising a pair of separate sections normally held in spaced relation by the cushioning means along their opposed longitudinal edges and adapted to be moved toward edgewise abutment by closing of said clamp so as to place the cushioning means under compression, said cushioning means including a split protecting sleeve removably engaged by the sections of the compression sleeve.

FRANK W. SCHWINN.